June 18, 1935.  E. C. POTTERF  2,005,634
INCLINOMETER
Filed Jan. 17, 1935
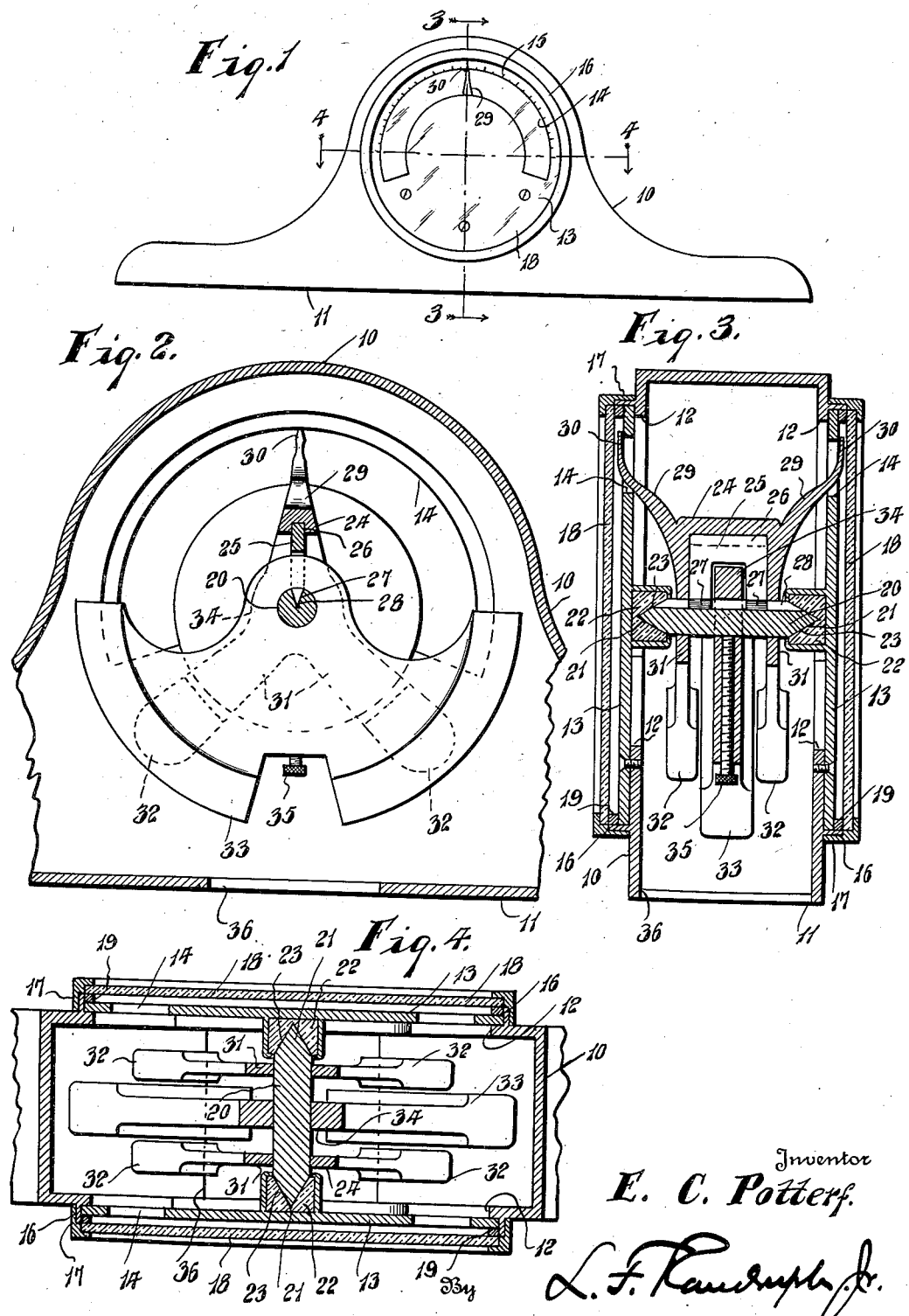
Inventor
E. C. Potterf.

Patented June 18, 1935

2,005,634

UNITED STATES PATENT OFFICE 2,005,634

INCLINOMETER

Edward C. Potterf, Noti, Oreg.

Application January 17, 1935, Serial No. 2,288

5 Claims. (Cl. 33—215)

The invention relates to inclinometers and has for its principal object the provision of a mechanically operated mechanism for indicating the relative inclination of a surface to the horizontal and thus dispensing with the usual spirit level structure and to provide means whereby the actual inclination of the surface will be immediately determined.

To this end the invention consists in the provision of a hand or hands used as pointers secured for rotation with a delicately journaled shaft that cooperates with a calibrated disk provided with graduations to indicate the inclination of the instrument relatively to the horizontal, and provided with an adjustable means for regulating the accuracy of the pointers relatively to the dial and consisting of a counterweight mounted for rotation on the shaft and held thereto by means of a set screw or other suitable means permitting adjustment of the counterweight relatively to the pointers for the purpose stated.

The invention will be described in detail hereinafter and will be found illustrated in the accompanyng drawing, in which Figure 1 is a side view in elevation of the improved inclinometer, Figure 2 is a fragmentary side view on an enlarged scale shown partly broken away and in section, Figure 3 is a vertical sectional view on a plane indicated by the line 3—3 of Figure 1, and Figure 4 is a horizontal sectional view on a plane indicated by the line 4—4 of Figure 1.

In the drawing similar reference characters are used to designate corresponding parts in all the views.

The improved inclinometer includes a casing 10 having a straight edge 11 forming the bottom of the casing. In the opposite sides of the casing 10 are openings 12 and mounted over said openings 12 are dial plates 13 provided with arcuate slots 14, and having the plate adjacent to said slots provided with calibrations 15 to indicate the degrees of a circle.

Circular frames 17 are mounted on the casing 10 and secured to circular flanges 16 projecting from the base of the casing and surrounding the dial plates 13, said frames 17 holding transparent panels 18, said panels 18 being separated from the dial plates 13 by means of cushion washers 19. 20 designates a shaft having tapered end portions 21 journaled in socket bearings 22 secured to the dial plates 13, the openings or sockets in said bearings numbered 22 being tapered as shown at 23 to receive the tapered end portions 21, this bearing being usually designated as a jewel bearing. Mounted for rotation on the shaft 20 is a U-shaped member 24 that is held from rotation on the shaft by means of a U-shaped key member 25 that has its bight portion engaging in a groove 26 in the bight portion of the U-shaped member 24, and having its extremities tapered to a knife edge as shown at 27 and engaging in a V-shaped slot 28 in the shaft 20.

Extending laterally from each side of the U-shaped member 24 is a pointer arm or hand 29 that has its extremities 30 extended through one or the other of the arcuate slots 14 and arranged to cooperate with the calibrations 15 on the respective dials 13.

The depending ends of the U-shaped member 24 are each bifurcated to provide angularly related arms 31 and the extremities of said arms are provided with weights 32, and provide means whereby the ends of the pointer hands or arms 30 will extend vertically at all times, and therefore indicate the inclination of the straight edge bottom portion 11, if any, to the horizontal.

In order to insure accuracy at all times of the operation of the device, a counterweight structure is provided that is adapted to be adjusted to obviate and counteract inaccuracies in the indicating device heretofore described. The counterweight structure is designated 33 and is preferably mounted as shown in the drawing on the shaft 20 by means of a loop suspending device 34, the counterweight 33 being mounted between the arms 31 and the weights 32, while the member 34 is mounted on the shaft 20 intermediate of the arms of the U-shaped key member 25. 35 indicates a set screw threadedly mounted in the counterweight member 33 and designed to secure the counterweight 33 for rotation with the shaft 20. The bottom 11 is provided with an opening 36 to enable screwing and unscrewing of the set screw 35 when it is necessary to adjust the counterweight on the shaft 20 to correct inaccuracies in the operation of the device heretofore described.

What is claimed is:—

1. In an inclinometer, a casing having a straight edge member, a pointer member mounted for rotation in said casing, dial plates on opposite sides of said casing and having arcuate slots therein, pointer arms mounted on said pointer member and having their extremities extended through said slots, weighted arms on said pointer member, a counterweight mounted for rotation with said pointer member, and means to adjust said counterweight relatively to the pointer member to correct the positions of said pointer arms relatively to the dials.

2. An inclinometer, comprising a casing having a straight edge member, a shaft journaled in said casing, a U-shaped member keyed to said shaft and having weighted arms, a pointer secured to said U-shaped member, a dial cooperating with said pointer and calibrated to indicate degrees of inclination to the horizontal, a counterweight mounted on said shaft, and means to adjustably secure said counterweight relatively to the shaft to correct the operation of the pointer relatively to the calibrations on the dial.

3. An inclinometer, comprising a casing having a straight edge member, a shaft journaled in said casing, a U-shaped member having a pointer mounted on said shaft, a U-shaped key secured to said member, the shaft provided with a keyway to receive said key, a dial in said casing cooperating with said pointer, weighted arms depending from said U-shaped member, a counterweight adjustably mounted on said shaft between the arms of said U-shaped key, and means to fix said counterweight relatively to the shaft to correct the operation of the pointer relatively to the dial calibrations.

4. In an inclinometer, a casing having an opening therethrough, dials mounted in said opening in spaced relation and provided with arcuate slots, a shaft, means journaling the shaft between said dials, a pointer member secured for rotation with said shaft and having arms extending through said slots for reading with the dials, depending angularly related and weighted arms on said pointer member, and an adjustable counterweight mounted for rotation with the shaft to correct the position of the member relatively to the dials.

5. In an inclinometer, a casing having an opening therethrough, dials mounted in said opening in spaced relation and provided with arcuate slots, a shaft having a keyway, means journaling the shaft between said dials, a U-shaped pointer member provided with a groove in its bight portion, a U-shaped key engaging in said keyway and groove, pointer arms extending from said pointer member and extending through said arcuate slots, depending angularly related and weighted arms on said pointer member, an adjustable counterweight rotatably mounted on the shaft, and a set screw mounted in said counterweight to position it in adjusting the positions of the pointer arms relatively to the dials.

EDWARD C. POTTERF.